Nov. 6, 1962   H. P. BLANCHARD   3,062,504
ELECTRIC AUTOMOBILE JACK
Filed Sept. 30, 1960   2 Sheets-Sheet 1
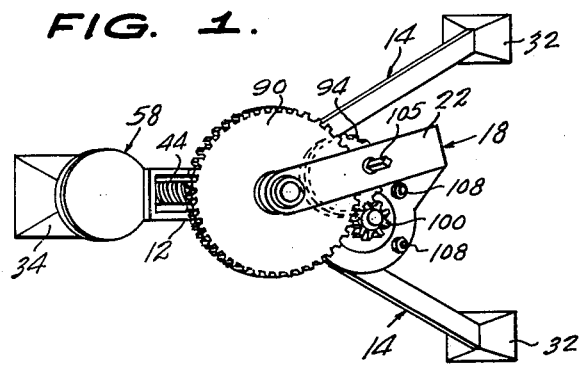
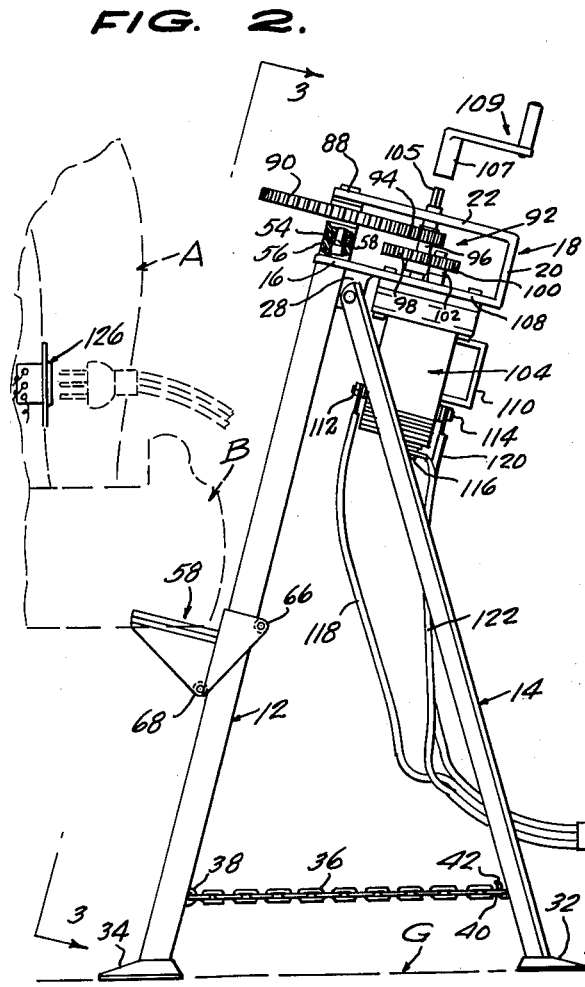
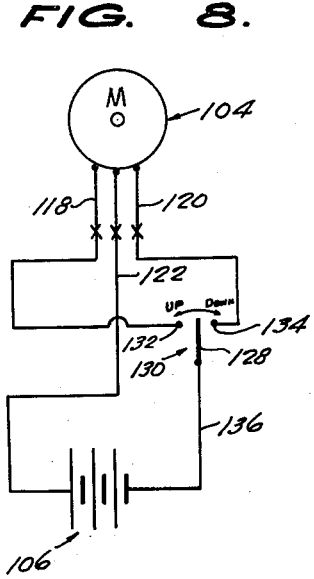
INVENTOR.
HILARY P. BLANCHARD,
BY
McMorrow, Berman + Davidson
ATTORNEYS.

Nov. 6, 1962 H. P. BLANCHARD 3,062,504
ELECTRIC AUTOMOBILE JACK
Filed Sept. 30, 1960 2 Sheets-Sheet 2

INVENTOR.
HILARY P. BLANCHARD,
BY
McMorrow, Berman & Davidson
ATTORNEYS.

United States Patent Office 3,062,504
Patented Nov. 6, 1962

3,062,504
ELECTRIC AUTOMOBILE JACK
Hilary P. Blanchard, 207 Patterson St., Houma, La.
Filed Sept. 30, 1960, Ser. No. 59,676
2 Claims. (Cl. 254—103)

This invention relates to a novel electric automobile jack of the folding tripod type.

The primary object of the invention is the provision of practical, compact, efficient, and reliable jack of the kind indicated, which is designed to be carried, in folded or collapsed condition, in the user's automobile, and to be powered by the battery of the automobile from a conveniently located electrical outlet on the automobile.

Another object of the invention is the provision of a lightweight, simple, rugged, and long-lasting jack of the character indicated above, wherein the operating parts, including the load-lifting bracket, are simple and easily assembled, and are mounted on anti-friction thrust bearings, is a manner which not only extends their operating lives, but eliminates excessive friction and binding and enables the jack to be adequately operated by an inexpensive, lightweight, low-powered electric motor.

Other important objects and advantageous features of the invention will be apparent from the following description and the accompanying drawings, wherein, for purposes of illustration only, a specific form of the invention is set forth in detail.

In the drawings:

FIGURE 1 is a top plan view of a jack of the present invention;

FIGURE 2 is a side elevation of said jack, showing the same applied to the front bumper of an automobile and connected to an electrical outlet on the bumper, the bumper and a part of the automobile being shown in phantom lines;

Figure 3:
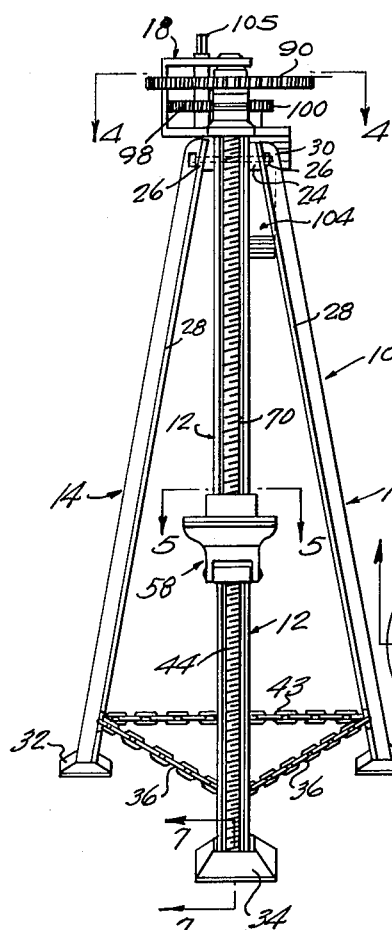
FIGURE 3 is a front elevation of the jack taken on the line 3—3 of FIGURE 2.
Figure 4:
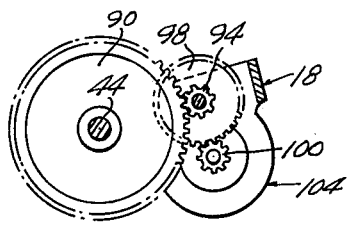
FIGURE 4 is a horizontal section taken on the line 4—4 of FIGURE 3.
Figure 5:
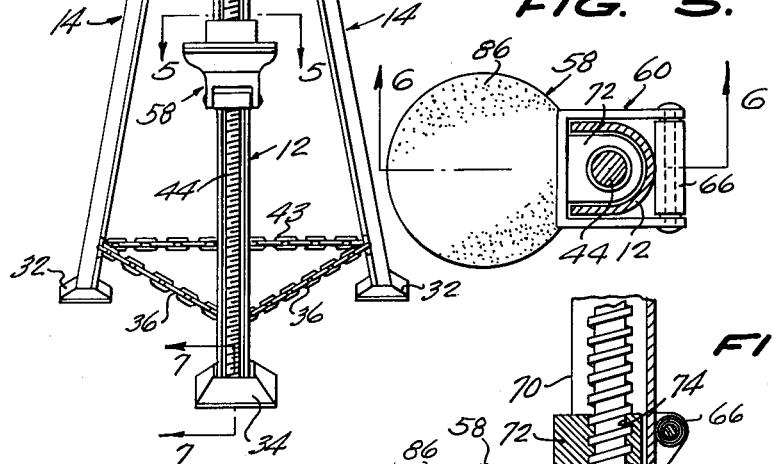
FIGURE 5 is an enlarged horizoned section taken on the line 5—5 of FIGURE 3.

Referring in detail to the drawings, wherein like numerals designate like parts throughout the several views, the illustrated jack comprises a tripod frame 10, preferably of aluminum, composed of a straight U-shaped tubular front leg 12, and two solid angle iron side legs 14. Fixed on and extending rearwardly from the upper end of the front leg 12 is the flat lower arm 16 of a U-shaped head 18, which has a bight portion 20, at its rear end, and an upper flat arm 22 located above and spaced parallel from the lower arm 16. A horizontally elongated reinforcing web 24 extends rearwardly from the front leg 12 and is secured to the underside of the lower arm 16. The web 24 extends beyond the opposed sides of the front leg 12, and has downwardly and outwardly angled ends 26, against which the forwardly projecting flanges 28 of the side legs 14 are rotatably engaged, at their upper ends, with a pivot bolt 30 extending therethrough and lengthwise through the web 24. The side legs 14 have flat feet 32 fixed on their lower ends, which, as shown in FIGURE 2, are angled relative to the legs 14 to bear flatly upon the ground G with the tripod frame 10 in spread position. A similar foot 34 is fixed on the lower end of the front leg 12. Stop chains 36 are secured at their forward ends, as indicated at 38, to the lower part of the front leg 12, and have loops 40 on their rear ends, to be engaged over upwardly opening hooks 42 on the flanges 28 of the side legs. A third stop chain 43 extends between the side legs 14.

Figure 7:
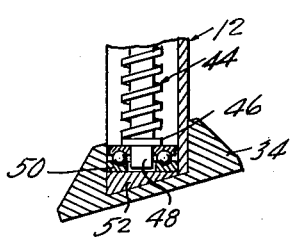
FIGURE 7 is a fragmentary vertical section taken on the line 7—7 of FIGURE 3; and, FIGURE 8 is a wiring diagram of the switched connections of the motor to the automobile battery.

The tubular front leg 12 has a worm screw 44 supported concentrically therein, which, as shown in FIGURE 7, has a bearing shoulder 46 and a pintle 48 on its lower end, the pintle 48 being extended through an antifriction thrust bearing 50, upon which the shoulder 46 rests. The bearing 50 rests upon a plug 52 secured in the lower end of the front leg. This arrangement, besides substantially reduces friction and prolonging the life of the parts, serves to support the major part of the load of an automobile being jacked up, without binding and without distortion of the worm screw and the front leg 12, and cuts down the power requirement of the driving motor. This is further helped by having a reduced diameter pintle 54, on the upper end of the worm screw 44, which extends through an anti-friction thrust bearing 56, engaged in the upper end of the front leg 12, with a thrust shoulder 58 bearing against the underside of the bearing 56.

Figure 6:
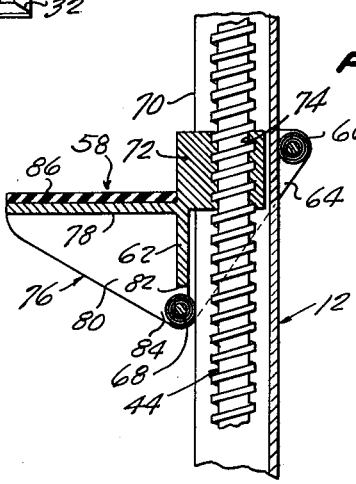
FIGURE 6 is a fragmentary vertical section taken on the line 6—6 of FIGURE 5.

Riding externally on the front tripod frame leg 12 is a load-lifting bracket, generally designated 58, which comprises a U-shaped yoke 60 having a bight portion 62, and rearwardly extending legs 64, which are disposed at opposite sides of the leg 12. The legs 64, are, as shown in FIGURES 2 and 6, of inverted triangular shape. A rear roller-bearing roller 66 extends between and is journalled at its ends, in the upper rear corners of the yoke legs 64 and bears against the rear side of the front leg 12.

The front leg 12 has a vertical slot 70 in its forward side, and a block 72, of substantially the same cross section as but spaced from the wall of the leg 12 is fixed on the upper end of the bight portion 62 of the yoke 60 and extends rearwardly through the slot 70 into the leg 12. The block 72 has a worm-thread vertical bore 74 in which the worm screw 44 is threaded Extending forwardly from the yoke bight portion 62, at right angles thereto, is an inverted channel 76 having a flat circular top web 78 and triangular side walls 80, beyond which the web 78 extends, which flare toward said bight portion and are affixed thereto, and at their rear ends extend below the lower edge 88 of the bight portion, as indicated at 84. A front roller bearing roller 68 extends between and is journalled at its ends, in the portions 84, and bears against the forward side of the front leg 12, on a level spaced below the rear roller 66. The upper surface of the web 78 of the channel 76 is covered by a nonskid resilient and compressible pad 86, of such as rubber, to preclude slippage between the lifting bracket 58, and a part of an automobile, such as a front bumper B.

On the pintle 54 above the upper end of the front tripod leg 12, which is journalled at its upper end in the upper arm 22 of the head 18, as indicated at 88, is a relatively large diameter gear wheel 90, which is disposed spacedly between the head arms 16 and 22, and is a component of a reducing gear train, generally designated 92.

The reducing gear train 92 further comprises a small gear wheel 94 which is fixed on a vertical shaft 96 which is journalled, at its ends, in the upper and lower head arms 16 and 22, and is in mesh with the large gear wheel 90. Below the small gear wheel 94, an intermediate size gear wheel 98 is fixed on the shaft 96, and is in mesh with a drive pinion 100 on the upstanding shaft 102 of an electric motor 104. On the upper end of the shaft 96 is a squared terminal 105 to which the socket 107 of a hand crank 109 is adapted to be applied, for operating the jack for preliminary positioning of the lifting bracket 58, or for operating the jack in the event of a current failure.

The motor 104 is preferably of 6-volt or 12-volt rating so as to run efficiently off the battery 106 of an automobile A to be jacked up. The motor 104 is disposed vertically beneath the head 18 and behind the front tripod leg 12, and is secured, at its upper end, as indicated at 108, to the underside of the lower arm 16. A jack carrying loop handle 110 is fixed on and extends rearwardly from the motor 104. This locates the handle 110 close to the center of gravity of the jack and enables balanced carrying of the jack.

On the motor 104 are external first, second, and third binding ports 112, 114, and 116 to which are severally connected first, second, and third wires 118, 120, and 122, and a grounding dead line 122, which are connected, at their other ends, to related prongs of a three-prong connector plug 124. The plug 124 is adapted to be plugged into a three-way outlet 126 which is mounted at a convenient location on the automobile A, and which is connected to the automobile battery 106.

It will be understood from the foregoing that, with the tripod in spread condition and set up on the ground G beneath a part of an automobile B, and the lifting bracket 58 under the bumper, and with the plug 124 plugged into the outlet 126, all the user has to do to raise the automobile is to energize the motor 104 to rotate in the proper direction. This is done, as indicated in FIGURE 8, by moving the actuator 128 of a suitable reversing switch 130, from neutral position, to engage the "up" contact 132. To depress the lifting bracket 58 to let the automobile down, the actuator 128 is moved to engage the "down" contact 134 of the switch. It will be understood that the switch 130 can be dispensed with and the bracket 58 operated only in the upward direction, merely by plugging the plug 124 into the socket 126, in which case the hand crank 109 is to be used for depressing the bracket 58.

As shown in FIGURE 8, the first wire 118 is connected to the "up" switch contact 132, the second wire 120 on the "down" switch contact 134, and the third wire 122 to one side of the battery 106. The other side of the battery is connected to the switch actuator 128 by a wire 136. A weatherproof protective cover (not shown) can readily be applied over the gear train 92 and the head 18, to enclose the same and prevent dirt and water accumulating thereon.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An automobile jack comprising a tripod having a front leg and side legs, said front leg having an open front side, a worm screw disposed vertically within the front leg, a lifting bracket threaded on the screw and having a lifting pad extending forwardly from the front leg, an element fixed on the upper end of the front leg, the screw being journalled at its lower end in the front leg and journalled at its upper end through said element, a motor mounted on said element, and means operatively connecting the motor to the screw above said element, said element being an arm extending rearwardly from the front leg, said motor being secured to the underside of said arm between the rear legs and having an upstanding shaft extending upwardly through said arm, said connecting means being located above said arm and acting between the shaft and the screw.

2. An automobile jack comprising a tripod having a front leg and side legs, said front leg having an open front side, a worm screw disposed vertically within the front leg, a lifting bracket threaded on the screw and having a lifting pad extending forwardly from the front leg, an element fixed on the upper end of the front leg, the screw being journalled at its lower end in the front leg and journalled at its upper end through said element, a motor mounted on said element, and means operatively connecting the motor to the screw above said element, said element being an arm extending rearwardly from the front leg, said motor being secured to the underside of said arm between the rear legs and having an upstanding shaft extending upwardly through said arm, said connecting means being located above said arm and acting between the shaft and the screw, said connecting means comprising gear means.

References Cited in the file of this patent

UNITED STATES PATENTS

| | | |
|---|---|---|
| 1,298,959 | Jones | Apr. 1, 1919 |
| 1,451,048 | Moore et al. | Apr. 10, 1923 |
| 1,477,790 | Townsend | Dec. 18, 1923 |
| 1,517,101 | Borger | Nov. 25, 1924 |
| 1,792,570 | Breuer | Feb. 17, 1931 |
| 2,738,952 | Nilson | Mar. 20, 1956 |
| 2,784,939 | Palka | Mar. 12, 1957 |
| 2,874,935 | Caster | Feb. 24, 1959 |

FOREIGN PATENTS

| | | |
|---|---|---|
| 145,991 | Great Britain | July 8, 1920 |
| 1,095,463 | France | Dec. 22, 1954 |